Aug. 1, 1961 E. BLUME ET AL 2,994,319
ENGINE HEATER
Filed July 9, 1957

INVENTORS
**ELMER BLUME
GEORGE E. DUIS**

BY *Wilmer Mechlin*

ATTORNEY

2,994,319
ENGINE HEATER
Elmer Blume, 808 2nd St. NW., Valley City, N. Dak.,
and George E. Duis, 701 11th Ave. N., Fargo,
N. Dak.
Filed July 9, 1957, Ser. No. 670,672
6 Claims. (Cl. 126—271.1)

This invention relates to heaters for internal combustion engines.

The starting of automobile engines in the extremely cold weather experienced in the northern part of the United States and comparable climates has long presented a problem due to the congealing of the lubricating oil and the consequent excessive strain placed on a battery which itself is weakened by the cold. The apparent solution for the problem is to preheat the oil to the point of fluidity and a number of heaters have been proposed for this purpose. While some have been designed to apply heat to the side of a crankcase above the oil level, or even to the side of an engine block, supposedly to use to advantage the relatively high heat conductivity of the metal to heat the cylinder walls as well as the oil pan, most of the proposed heaters apply heat to the bottom of the oil pan and in this respect have proved saisfactory. However, although usually capablle of performing their intended function of warming an engine, the heaters thus far proposed either depend on an outside power supply, are intended as a permanent installation or, if portable and self-contained, are so cumbersome as to render their use impracticable. The result has been that, except for permanent installations having their own fuel tanks, the proposed engine heaters were usable as a practical matter only where electricity or other power supply was readily available, with consequent detriment to their usefulness.

The primary object of the present invention is to provide an improved engine heater which is independent of an outside power supply, readily portable and applicable temporarily to any engine requiring its services.

Another object of the invention is to provide an improved engine heater which is compact and self-contained and is attachable temporarily directly to the oil pan of an engine requiring heating, without bolting or the provision of a special fixture on the engine.

An additional object of the invention is to provide an improved engine heater which employs canned fuel as its heating medium and is of such construction and arrangement as effectively to spread the heat over the bottom of the oil pan to which it is temporarily applied without interference with easy loading of the canned fuel.

A further object of the invention is to provide an improved engine heater which not only is effective when applied to its primary purpose but, in case of necessity, may be employed as a survival heater.

Other objects and advantages of the invention will appear hereinafter in the detailed description, be particularly pointed out in the appended claims and be illustrated in the accompanying drawings, in which:

Figure 1:
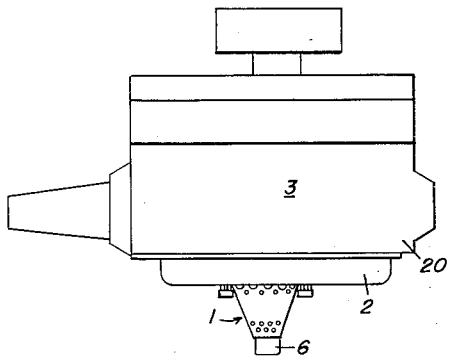
FIGURE 1 is a somewhat schematic side elevational view of an engine to which a preferred embodiment of the engine heater of the present invention has been applied.
Figure 2:
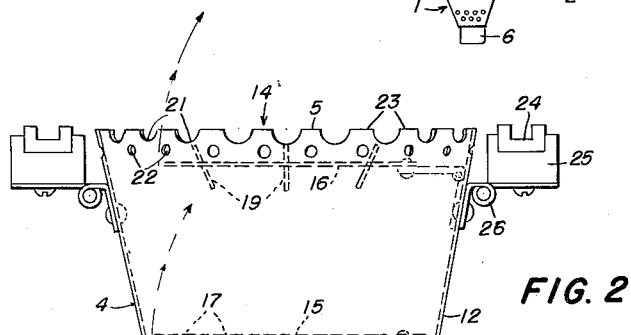
FIGURE 2 is a side elevational view on an enlarged scale of the engine heater shown in FIGURE 1.
Figure 3:
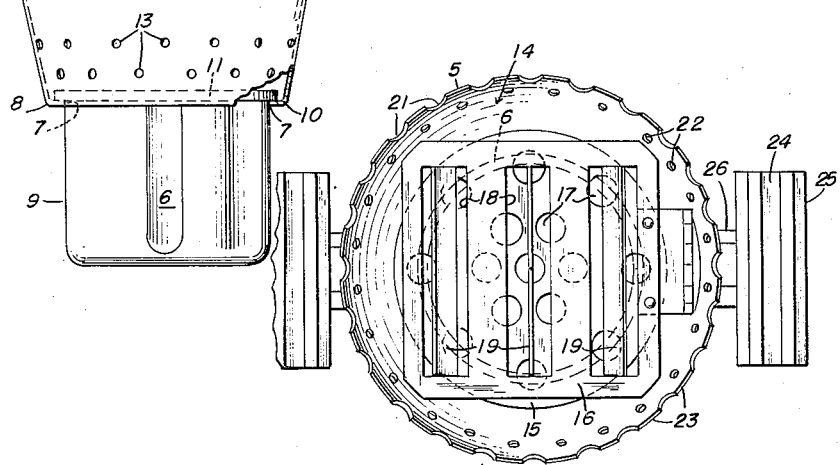
FIGURE 3 is a plan view of the engine heater of FIGURE 2.

Referring now in detail to the drawings in which like reference characters designate like parts, the improved engine heater of the present invention, while adaptable generally for heating internal combustion engines, will find particular application to the engines of automobiles, tractors and like self-propelled vehicles.

Designated as 1, the engine heater has been applied for purposes of illustration to the bottom of an oil pan 2 of a typical automobile engine 3. The heater 1 is comprised of an upwardly flaring, preferably substantially frusto-conical shell, case or housing 4, which, conveniently, may be made of sheet metal drawn, stamped or otherwise formed to shape. Open at at least its upper or top end 5, the shell 4 is designed to seat therebelow a container, can or receptacle 6 for containing or holding the fuel from which the heater derives its heat. While the container 6 conceivably might be fixed to the shell 4 and refillable with fuel as needed, it has been found desirable, both for efficiency in operation and for ease in handling, to employ a solid packaged fuel or fuel cake, such as "Sterno," the disposable can of which serves readily as the container 6.

For removably seating the can 6 within the shell 4, the latter in its preferred form has an opening 7 in its lower or bottom end 8 of a cross-sectional area to slidably receive the side 9 of the can 6. Surrounding or encircling the bottom opening 7 and either connected to or, as shown, integral with the shell 4 is an upwardly facing annular seat 10 against which the rim 11 at the top of the can 6 is adapted to seat when the can is fully inserted in the opening 7. For supplying air to the fuel, there are provided in the lower part of the side wall 12 of the shell 4, adjacent the seat 10, a plurality of perforations or inlet ports 13, spaced circumferentially about the seat and conveniently arranged in a plurality of vertically spaced rows.

To prevent the flame of the burning fuel from impinging directly on the oil pan 2 and instead spread its heat over the top opening or mouth 14 of the shell 4, there is fitted into the shell intermediate its vertical extremities and above the top of the can 6 one or a plurality of baffle plates, each hingedly connected at a side to the interior of the side wall 12 of the shell so as to be disposed normally in substantially horizontal position above the container 6 and to be swingable upward out of the way during insertion and removal of the can 6. The shell of the heater of the disclosed embodiment is fitted with two superposed baffle plates, a lower baffle plate 15 disposed somewhat above the seat 10 and an upper baffle plate 16 spaced above the lower baffle plate 15 and disposed adjacent the mouth 14 of the shell 4.

Although together cooperating to spread the heat from the burning fuel over the mouth 14 of the shell 4, the baffles 15 and 16 have somewhat different individual functions and are of forms appropriate thereto. The lower baffle plate 15 is so spaced relative to the seat 10 as to be impinged upon directly by the flame from the burning fuel and serves mainly to spread the flame transversely or laterally of the shell and substantially confine the flame vertically to the portion of the shell below the baffle, while permitting passage of the hot gases toward the mouth 14. To this end, the lower baffle 15 preferably is a somewhat domed, downwardly concave disc of a diameter somewhat less than the section of the shell in which it normally lies or is disposed and interrupted by a plurality of spaced vertically directed substantially circular openings 17 for escape of hot gases therethrough to the upper part of the shell. Since exposed directly to the heat of the flame, the lower baffle itself transmits heat to the upper portion of the shell by radiation from its upper surface. Purposed mainly to spread over the mouth 14 of the shell 4 the hot gases which have passed through or around the lower baffle plate 15, the upper baffle plate 16 of the disclosed embodiment is interrupted by a plurality of spaced, substantially parallel, transversely elongated slots 18, each in turn interrupted by a baffle or deflector 19 for directing the hot gases passing therethrough. Conveniently, the baffles 19 may be integral with and stamped from the material of which the upper baffle plate 16 is formed. To enable the upper baffle plate 16 to accomplish its purpose, the baffles on either side of its center are inclined or sloped relative to its plane and diverge upwardly so as to direct outwardly the hot gases passing through the surrounding of the slots 17.

On passing through and around the upper baffle plate, the hot gases impinge upon and apply heat to the bottom of the oil pan 2 to heat the oil in the pan above the mouth 14 of the shell 4. This heat will in part be conducted through the metal over the oil pan and to the cylinder block 20 of the engine 3 to heat the walls of the cylinders (not shown). However, the burner of this invention does not depend entirely upon conduction to extend its heat over the oil pan beyond the limits of the mouth 14. Instead, it also makes use of the heat remaining in the hot gases escaping from the shell by exhausting these gases radially from the shell at or in close proximity to the bottom of the oil pan 2 so that the gases are spread over and transfer heat to the outlying areas of the oil pan before being lost to the atmosphere. This is accomplished by serrating or scalloping the upper end 5 of the shell forming its upper rim to provide a plurality of substantially semi-circular outlets or exhaust ports 21 spaced circumferentially about the rim and opening both outwardly and upwardly so as to be confined or closed upwardly by the oil pan when the heater is in heating position. If desired, these exhaust ports 21 may be supplemented by a row of radially directed, circumferentially spaced supplemental exhaust ports 22 extending about the shell below and adjacent its upper rim 5 and each preferably aligned vertically with one of the lands 23 spacing the exhaust ports 21 formed in the upper rim.

The lightweight structure formed by the shell 4, its baffle plates 15 and 16 and the can 6 of solid fuel requires neither modification of an engine to provide an attaching fixture nor a stand to hold it in place. In lieu thereof, the heater 1 is designed to be held magnetically to the oil pan 2 while heating the engine 3. To this end, there are attached to the outer face of the shell 4 adjacent its upper end a plurality of "Alnico" or other permanent magnets 24 of sufficient strength together to support the weight of the heater. Preferably, two such magnets are employed, one at either side of the shell. Each of the magnets 24 preferably has a non-magnetic base 25 and is hingedly mounted or attached to the shell by a mounting 26, so as to enable the magnets to be self-aligning or adjusting for full bearing or contact with the overlying portion of the oil pan.

From the above detailed description, it will be apparent that there has been provided an improved heater for internal combustion engines which, while of light weight for easy handling, is efficient in operation, easily refueled and readily attached to an oil pan of any engine without modification of the latter, thus enabling a single heater to be used for heating any number of engines. Too, due to its compactness, the heater may conveniently be carried in an automobile and used not only for heating an engine to facilitate starting, but in case of dire necessity, as when a car is marooned in a blizzard, as a survival heater to keep the occupants alive until help arrives. It should be understood that the described and disclosed embodiment is merely exemplary of the invention and that all modifications are intended to be included which do not depart from either the spirit of the invention or the scope of the appended claims.

Having described our invention, we claim:

1. A self-contained heater for an internal combustion engine comprising an upwardly flaring substantially frusto-conical shell having an open upper end and having inlet and outlet ports respectively in lower and upper portions thereof, a seat in said lower portion of said shell for removably seating a fuel container, baffle means in said shell above said container for spreading hot gases from burning fuel over said open upper end, said baffle means being hingedly attached to said shell for swinging to out-of-the-way position on insertion and removal of said container, and permanently magnetized means attached to the outside of said shell adjacent said upper end for releasably securing said heater to an oil pan of an engine.

2. A self-contained heater for an internal combustion engine comprising an upwardly flaring substantially frusto-conical shell having open upper and lower ends and having inlet and outlet ports respectively in lower and upper portions thereof, a seat in the lower end of said shell and surrounding the opening therein for removably seating a can of solid fuel insertible from the top into said bottom opening, baffle means in said shell above said container for spreading hot gases from burning fuel over said open upper end, said baffle means being hingedly attached to said shell for swinging to out-of-the-way position on insertion and removal of said container, and permanently magnetized means attached to the outside of said shell adjacent said upper end for releasably securing said heater to an oil pan of an engine.

3. A self-contained heater for an internal combustion engine comprising an upwardly flaring substantially frusto-conical shell having an open upper end and having inlet and outlet ports respectively in lower and upper portions thereof, a seat in said lower portion of said shell for removably seating a fuel container, baffle means in said shell above said container for spreading hot gases from burning fuel over said open upper end opening, said baffle means being hingedly attached to said shell for swinging to out-of-the-way position on insertion and removal of said container, and self-aligning permanently magetized means attached to opposite sides of said shell outwardly and adjacent said upper end thereof for releasably securing said heater to an oil pan of an engine.

4. A self-contained heater for an internal combustion engine comprising an upwardly flaring substantially frusto-conical shell having an open upper end, a seat in a lower portion of said shell for removably seating a fuel container, a plurality of inlet ports in and spaced about a lower portion of said shell adjacent said seat, a plurality of outlet ports spaced about said shell adjacent said upper end thereof, baffle means in said shell above said container for spreading hot gases from burning fuel over said open upper end, said baffle means being hingedly attached to said shell for swinging to out-of-the-way position on insertion and removal of said container, and self-aligning permanently magnetized means attached to opposite sides of said shell outwardly and adjacent said upper end thereof for releasably securing said heater to an oil pan of an engine.

5. A self-contained heater for an internal combustion engine comprising an upwardly flaring substantially frusto-conical shell having an open upper end, a seat in the lower end of said shell and surrounding the opening therein for removably seating a can of solid fuel insertible from the top into said bottom opening, a plurality of inlet ports in and spaced about a lower portion of said shell adjacent said seat, a plurality of outlet ports spaced about said shell adjacent said upper end thereof, baffle means in said shell above said container for spreading hot gases from burning fuel over said open upper end, said baffle means being hingedly attached to said shell for swinging to out-of-the-way position on insertion and removal of said container, and self-aligning permanently magnetized means attached to opposite sides of said shell outwardly and adjacent said upper end thereof for releasably securing said heater to an oil pan of an engine.

6. A self-contained heater for an internal combustion engine comprising an upwardly flaring substantially frusto-conical shell having an open upper end, a seat in the lower end of said shell and surrounding the opening therein for removably seating a can of solid fuel insertible from the top into said bottom opening, a pair of vertically spaced baffle plates in said shell intermediate said seat and upper end, said baffle plates normally overlying said seat and being swingable to out-of-the-way position for insertion and removal of said can, the lower of said baffle plates substantially confining the flame from burning fuel to the portion of said shell therebelow and being perforated to pass hot gases therethrough, the upper of said baffle plates being slotted to pass hot gases and carrying deflector means for spreading said gases over said open upper end, a plurality of inlet ports in and spaced about a lower portion of said shell above said seat, a plurality of outwardly and upwardly opening outlet ports interrupting and spaced about said upper end of said shell for exhausting gases substantially radially from said upper end of said shell, and self-adjusting permanent magnets at opposite sides of said shell and each hingedly attached to the outside thereof adjacent said upper end for releasably securing said heater to an oil pan of an engine.

References Cited in the file of this patent

UNITED STATES PATENTS

| | | |
|---|---|---|
| 756,191 | Warren | Mar. 29, 1904 |
| 936,482 | Seeley | Oct. 12, 1909 |
| 1,254,019 | Ball | Jan. 22, 1918 |
| 1,321,980 | Chausse | Nov. 18, 1919 |
| 1,599,179 | McCaughey | Sept. 7, 1926 |
| 1,674,237 | Bauer | June 19, 1928 |
| 2,553,668 | Morello | May 22, 1951 |
| 2,642,999 | McPherson | June 23, 1953 |

FOREIGN PATENTS

| | | |
|---|---|---|
| 68,021 | Germany | Dec. 31, 1890 |
| 117,661 | Switzerland | Nov. 16, 1926 |